United States Patent
Hoye

(10) Patent No.: US 11,100,329 B1
(45) Date of Patent: Aug. 24, 2021

(54) RANGING SYSTEM DATA UTILIZATION FOR MARKING OF VIDEO DATA OF INTEREST

(71) Applicant: Lytx, Inc., San Diego, CA (US)

(72) Inventor: Brett Hoye, San Marcos, CA (US)

(73) Assignee: Lytx, Inc., San Diego, CA (US)

( * ) Notice: Subject to any disclaimer, the term of this patent is extended or adjusted under 35 U.S.C. 154(b) by 100 days.

(21) Appl. No.: 16/540,970

(22) Filed: Aug. 14, 2019

(51) Int. Cl.
| | |
|---|---|
| G06K 9/00 | (2006.01) |
| H04N 5/765 | (2006.01) |
| G06T 7/00 | (2017.01) |
| G11B 27/34 | (2006.01) |
| G01S 13/931 | (2020.01) |

(52) U.S. Cl.
CPC ..... *G06K 9/00718* (2013.01); *G06K 9/00791* (2013.01); *G06T 7/0002* (2013.01); *G11B 27/34* (2013.01); *H04N 5/765* (2013.01); *G01S 13/931* (2013.01); *G01S 2013/9323* (2020.01); *G06K 2209/27* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 10,427,655 B2* | 10/2019 | Nix | ..................... | G06K 9/00718 |
| 10,535,138 B2* | 1/2020 | Pfeiffer | ..................... | G06T 7/11 |
| 10,806,075 B2* | 10/2020 | Grufman | ............... | G05D 1/0274 |
| 10,878,696 B2* | 12/2020 | Noel | ....................... | G06Q 50/26 |
| 10,884,115 B2* | 1/2021 | Ingram | .................. | G01S 13/865 |
| 2005/0102080 A1* | 5/2005 | Dell' Eva | .................. | G06T 7/20 701/45 |
| 2005/0187714 A1* | 8/2005 | Brulle-Drews | .......... | G01W 1/10 702/3 |
| 2010/0063680 A1* | 3/2010 | Tolstedt | ............... | G05D 1/0214 701/41 |
| 2013/0158821 A1* | 6/2013 | Ricci | ....................... | G07C 5/006 701/51 |
| 2013/0253767 A1* | 9/2013 | Lee | ......................... | B60W 50/04 701/42 |
| 2015/0019043 A1* | 1/2015 | Creasey | ................ | G05D 1/0038 701/2 |
| 2015/0081188 A1* | 3/2015 | Kornhaas | ........... | B60W 30/0956 701/70 |
| 2015/0254985 A1* | 9/2015 | Fisher | ................. | G06K 9/00362 348/148 |
| 2016/0092755 A1* | 3/2016 | Fairfield | ............... | G05D 1/0257 701/28 |

(Continued)

*Primary Examiner* — Shervin K Nakhjavan
(74) *Attorney, Agent, or Firm* — Van Pelt, Yi & James LLP

(57) ABSTRACT

A system for video processing includes a ranging system hardware interface, a vehicle bus interface, and a processor. The ranging system hardware interface is configured to receive ranging system data and/or ranging system metadata. The a vehicle bus interface is configured to receive vehicle bus data and vehicle bus metadata sent from a ranging system. The processor is configured to determine video data of interest based at least in part on the ranging system data and the ranging system metadata. The ranging system data and/or the ranging system metadata data includes information not included in the vehicle bus data and vehicle bus metadata sent from the ranging system via the vehicle bus interface.

26 Claims, 11 Drawing Sheets

(56) References Cited

U.S. PATENT DOCUMENTS

| | | | | |
|---|---|---|---|---|
| 2016/0173740 A1* | 6/2016 | Corby | ............... | F16M 11/26 |
| | | | | 348/144 |
| 2016/0370801 A1* | 12/2016 | Fairfield | ............. | G05D 1/0038 |
| 2017/0213462 A1* | 7/2017 | Prokhorov | ........... | G08G 1/0965 |
| 2017/0332198 A1* | 11/2017 | Dannenbring | ........ | H04W 4/022 |
| 2017/0371348 A1* | 12/2017 | Mou | ...................... | G01S 17/86 |
| 2018/0075309 A1* | 3/2018 | Sathyanarayana | ... | G05D 1/0055 |
| 2018/0137698 A1* | 5/2018 | Yasuda | .................. | B60R 21/00 |
| 2019/0178998 A1* | 6/2019 | Pacala | .................... | G01C 21/20 |
| 2019/0333378 A1* | 10/2019 | Iuzifovich | .......... | G06K 9/00785 |
| 2020/0065711 A1* | 2/2020 | Clement | .............. | G06N 3/0454 |
| 2020/0098394 A1* | 3/2020 | Levinson | .............. | G08G 1/166 |
| 2020/0142426 A1* | 5/2020 | Gist, IV | ............... | G05D 1/0231 |
| 2020/0160070 A1* | 5/2020 | Sholingar | .............. | G06N 3/084 |
| 2020/0225662 A1* | 7/2020 | Dev | .................. | G06K 9/00791 |
| 2020/0242920 A1* | 7/2020 | Pfadler | ............... | G05D 1/0088 |
| 2020/0286247 A1* | 9/2020 | Niesen | ................. | G01S 13/867 |

\* cited by examiner

RANGING SYSTEM DATA UTILIZATION FOR MARKING OF VIDEO DATA OF INTEREST

BACKGROUND OF THE INVENTION

Modern transportation vehicles (e.g., airplanes, boats, trains, cars, trucks, etc.) often include a vehicle event recorder in order to support driver safety, operational safety, and operational productivity. A vehicle event recorder typically includes a set of sensors (e.g., video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g. accidents, risky maneuvers, unexpected locations, proximity risks, vehicle malfunctions, or improper driver behavior). In addition, many transportation vehicles currently employ ranging systems such as video, RADAR and LiDAR systems as standard equipment to control the vehicle and warn the driver. These ranging systems are connected to the vehicle data bus and typically provide indications of conditions that merit warning the driver. However, raw data or a full set of derived metadata from the ranging systems are usually not available especially when the vehicle is not moving or ignition is off. This creates a problem as the raw data or full metadata are useful as input for processing.

BRIEF DESCRIPTION OF THE DRAWINGS

Various embodiments of the invention are disclosed in the following detailed description and the accompanying drawings.

DETAILED DESCRIPTION

Figure 1:
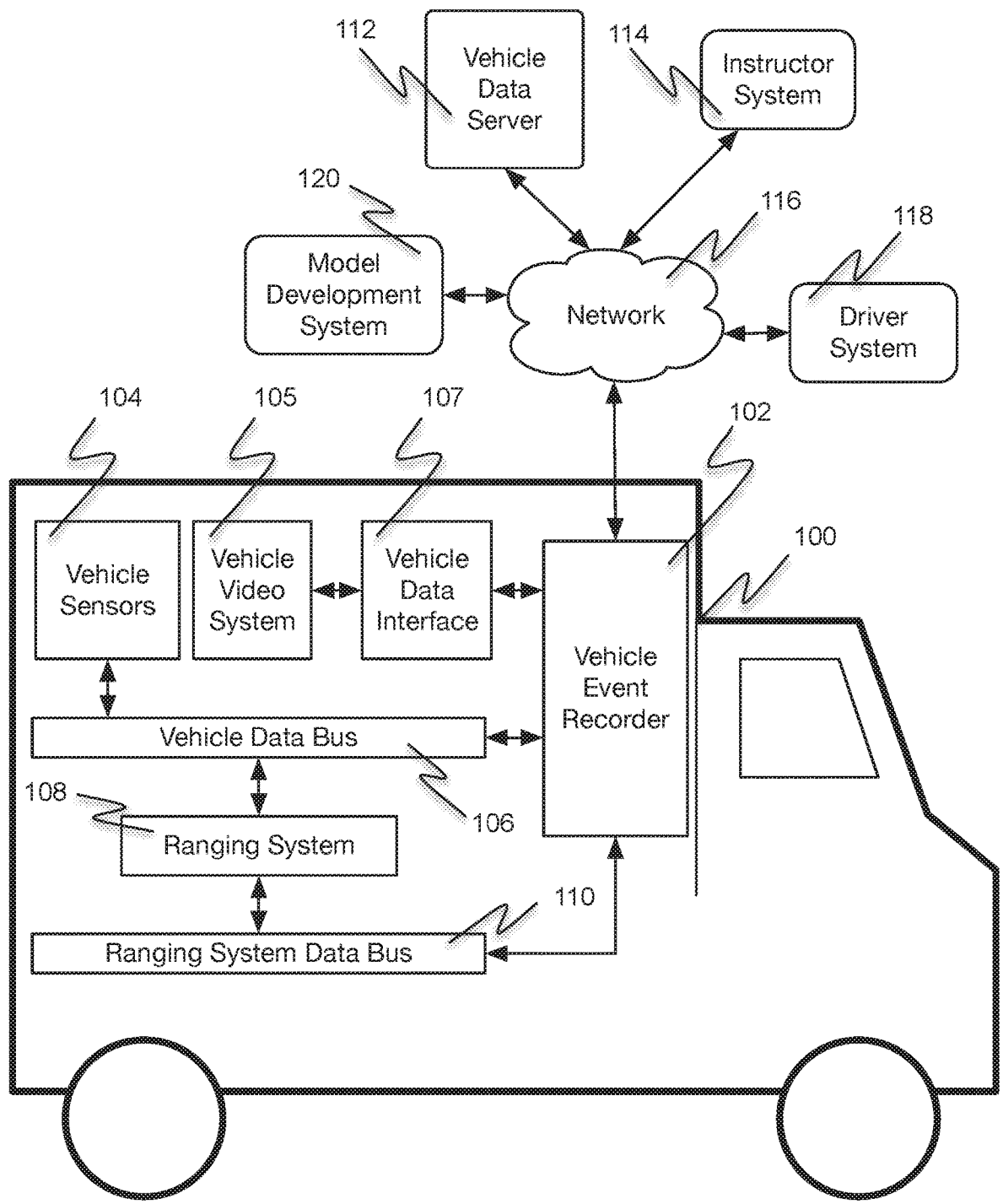
FIG. 1 is a block diagram illustrating an embodiment of a system for utilizing lidar and/or radar system data to mark video data of interest.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for marking video data of interest comprising a ranging system hardware interface, a vehicle bus interface, and a processor is disclosed. The ranging system hardware interface is configured to receive ranging system data and/or ranging system metadata. The vehicle bus interface is also configured to receive vehicle bus data and vehicle bus metadata sent from a ranging system. The processor is configured to determine video data of interest based at least in part on the ranging system data and the ranging system metadata, where the ranging system data and/or the ranging system metadata data includes information not included in the vehicle bus data and the vehicle bus metadata sent from the ranging system via the vehicle bus interface. In various embodiments, the ranging system data and/or the ranging system metadata data includes information that may or may not be not included in the standard vehicle bus data and the vehicle bus metadata sent from the ranging system via the vehicle bus interface at all times (e.g., not available when the vehicle is off).

The system for marking video data of interest receives data from a ranging system. The data from the ranging system includes raw ranging data and/or metadata derived from the ranging data or about the raw data and its acquisition. This data is more detailed and/or more fundamental than the data typically provided to a vehicle via the vehicle data bus. In addition, the data may be provided outside the normal operational time period. For example, when the ignition is off or when in power-take-off (PTO) mode. The more detailed and/or more fundamental data enable a vehicle event recorder to perform more detailed analysis of events surrounding the vehicle. The analysis is able to annotate a video data stream recorded by interior and/or exterior video cameras of the vehicle or the vehicle event recorder. The annotated video data stream can be pre-tagged and/or reviewed after uploading to a data server to allow the video timeline to be annotated with time segments that would be useful for coaching or training of the vehicle driver or in support of operational use cases. For example, proper safety procedures, outside the vehicle, identification of activity outside of the vehicle, etc. These time segments can be combined or further annotated by an instructor reviewing the video and then provided to a driver system or operational system to view or be coached.

In some embodiments, the ranging system comprises a video system, a lidar system, and/or a radar system. For example, the radar system returns range measurements about a forward vehicle. Based on range measurements, the vehicle event recorder can alert the driver system that the driver is following too close or alert the instructor system about whether the driver is adhering to the warnings.

In some embodiments, the Lidar system returns range measurements as well as object classification. For example, a lidar generated 3D map includes information about specific object classification (e.g. bicycles, pedestrians, etc.) and that information can be used for driver behavior and driver compliance—especially when the vehicle is stationary and the driver is doing other work around the vehicle. It can also be used to classify risky events. For example, speeding in a school zone with pedestrians present.

In some embodiments, a video system includes a processor that is able to estimate ranging data based on two or more video cameras and transforming the video data into ranging data (e.g., using a stereoscopic ranging calculation).

In some embodiments, the ranging system hardware interface is configured to provide the ranging system hardware interface a power up indication or an indication to enable operation in order to provide ranging data and/or ranging metadata. This enables a vehicle event recorder to utilize ranging data and/or ranging metadata in situations when a vehicle does not turn on the ranging system (e.g., when the vehicle is stationary, when the vehicle is off, when the ignition is off, etc.) or for locations not normally considered important (e.g., in front when the vehicle is reversing, in back when the vehicle is moving forward, to the side when the vehicle is moving slowly, etc.). In some embodiments, the ranging system hardware interface is further configured to provide the ranging system hardware interface with a request for the ranging system data and the ranging system metadata. In some embodiments, the vehicle event recorder is able to receive ranging system data and ranging system metadata when the vehicle is not moving and/or when the vehicle ignition is off.

In some embodiments, video data is not passed to the vehicle data server unless requested. In various embodiments, video metadata is passed to the vehicle data server that identifies segments of video data that may include coachable driver behaviors, workman's compensation coachable behaviors, safety compliance coachable situations, or any other appropriate identified segments. In some embodiments, a decision to transfer video is determined using an algorithm running on a vehicle data server, a safety program management system (e.g., an instructor system), or a client using a client system. In some embodiments, video data is received by the vehicle event recorder via separate video data bus (e.g., a vehicle camera interface).

In various embodiments, the ranging system data and/or ranging system metadata includes object characterization data regarding an object. For example, the object comprises at least one of: a person, a vehicle, a building, a bicycle, a scooter, a motorcycle, a truck, an adult, a child, a cone, a garbage can, a box, a pedestrian, a safety gear item, a hat, a vest, or any other appropriate characterization for an object.

In various embodiments, the object characterization data comprises at least one of: a distance, a direction, a speed, a lane, a position, a driver behavior, a work behavior, a compliance behavior, a theft behavior, a vehicle entry time, a vehicle exit time, a cargo entry time, a cargo exit time, a behavior stop time, a behavior start time, an engine on time, an engine off time, a traffic state, an activity near a loading gate, an activity near a rear lift, a safety behavior, or any other appropriate characterization.

The system improves a computer system by improving availability of data (e.g., ranging system data) and using the data for enhancing detection of important data and noting that data for further use. The detection of important data and noting it enables more efficient reviewing of data by a user of the system by reducing the time it takes to review a data set and making the system more practical to use. It also reduces the amount of video data needed to be transferred for video review and coaching. In some cases, the data set comprises a large amount of continuous data from cameras, ranging sensors, or other sensors attached to a vehicle that provide information about surrounding objects to a vehicle that is impractical to review entirely by a human reviewer. It is also too expensive to transfer all the video to the vehicle data server. Useful information for coaching and/or training of drivers for the vehicles can be more rapidly identified by marking data from the sensors that satisfies criteria or is identified using models trained to identify data patterns of interest and having that subset of data reviewed by the reviewer. For example, the data patterns of interest may include risky data patterns, identifiable activity data patterns, identifiable operational data patterns that have been determined to be of interest. In addition, the data can be used to classify the state of the driver (e.g. in vehicle, at the back lift, etc.) for operational and workman's comp coaching.

FIG. 1 is a block diagram illustrating an embodiment of a system for utilizing lidar and/or radar system data to mark video data of interest. In the example shown, vehicle 100 comprises ranging system data bus 110, vehicle data bus 106, vehicle event recorder 102, vehicle sensors 104, vehicle video system 105, video data interface(s) 107, and ranging system 108. Ranging system data bus 110 carries information between ranging system 108 and vehicle event recorder 102. Vehicle data bus 106 carries information between vehicle sensors 104, ranging system 108, and vehicle event recorder 102. Video data interface(s) 107 carries video data between vehicle video system 105 and vehicle event recorder 102. Vehicle event recorder 102 processes the data from ranging system data bus 110, vehicle data bus 106, and video data from interface(s) 107 to determine video segments of interest and send that information to vehicle network server 112. Alternatively, vehicle event recorder 102 can send video segment and video metadata and driving data to network to vehicle data server 112 so that the vehicle data server 112 can apply algorithms to the video and video metadata and driver metadata to determine which video segments to transfer to the vehicle data server 112. Additionally, the video metadata and driving metadata can be reviewed and segments of video are transferred based on the metadata and this video is curated by an instructor using instructor system 114 to create coaching data. The coaching data is distributed to driver system 118 for coaching sessions with a driver. For example, vehicle 100 stops at a particular location where vehicle event recorder 102 records the GPS location from sensors of the vehicle event recorder 102, vehicle state information from the vehicle data bus 106, lidar data from the ranging system data bus 110, and video data from video data interface 107. Vehicle event recorder 102 processes the received data and detects pedestrian activity around the vehicle. Vehicle event recorder 102 then marks video from vehicle cameras as epochs of interest (e.g., time periods with high likelihood of pedestrians near vehicle) and sends the video metadata via network 116 to vehicle data server 112. Vehicle event recorder 102 stores the video of interest (received via video data interface(s) 107) where it can be retrieved by vehicle data server 112 to be accessed by instructor system 114 and driver system 118. For example, an instructor reviewing the video of interest may use instructor system 114 to annotate the video data so that the video can be part of a coaching session that is viewed by a driver using driver system 118 to improve driver behavior. Alternatively, the user, based on the video metadata, can pull back video using the vehicle data server 112 and perform their own analysis of the video segments.

For training purposes, video of interest data can be rated and/or reviewed to generate training data either using vehicle data server 112 and/or instructor system 114. In some embodiments, training data is provided to model development system 120. Model development system 120 creates new or updated models (e.g., a risk factor model, an activity model, an operational model, etc.) and provides the new or updated model to a vehicle event recorder.

In some embodiments, the video data of interest is used to generate video metadata that is transmitted to a server, wherein the server evaluates the video metadata to determine whether the video data of interest is to be transferred to the server (e.g., for use for human or machine vision and/or coaching analysis, for use for a customer for review or coaching, etc.).

Figure 2:
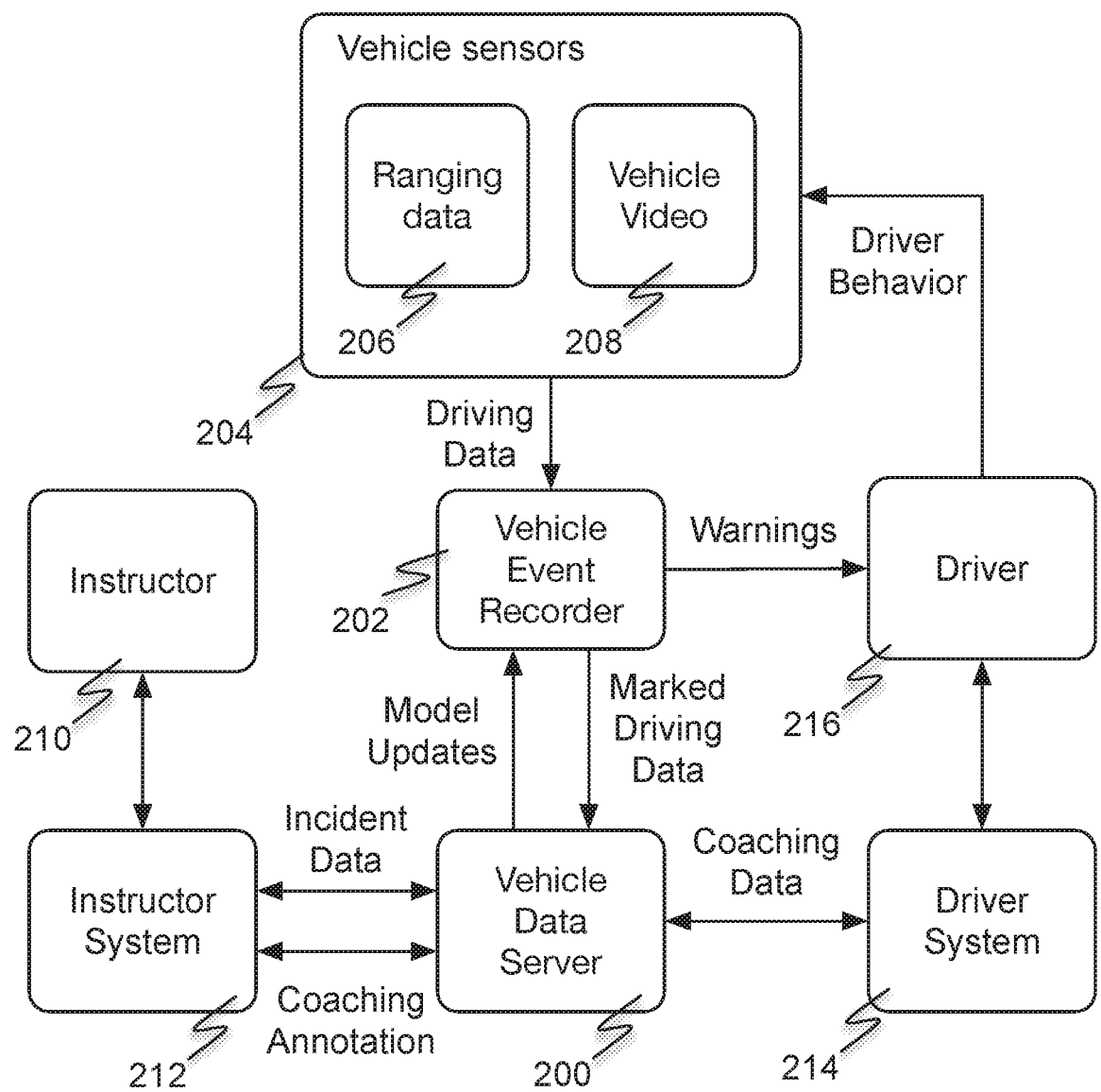
FIG. 2 is a block diagram illustrating an embodiment of data flows with feedback between vehicle event recorder, instructor system, and driver system.

FIG. 2 is a block diagram illustrating an embodiment of data flows with feedback between vehicle event recorder, instructor system, and driver system. In some embodiments, vehicle event recorder 202, vehicle data server 200, driver system 214, and instructor system 212 of FIG. 2 correspond to vehicle event recorder 102, vehicle data server 112, driver system 118, and instructor system 114 of FIG. 1. In the example shown, vehicle event recorder 202 receives driving data from vehicle sensors 204 including ranging data 206 and vehicle video 208. Vehicle event recorder 202 then processes the driving data and outputs marked driving data to vehicle data server 200 and potential direct warnings to driver 216. Instructor 210 interfaces to instructor system 212 to review incident data from vehicle data server 200 and to provide coaching annotations that are then stored on vehicle data server 200. Driver 216 interfaces with driver system 214 to receive coaching data from vehicle data server 200. In response to coaching data from instructor 210 and warnings from vehicle event recorder 202, driver 216 changes driver behavior. This modified behavior is captured by vehicle sensors 204 and transmitted as new driving data to vehicle event recorder 202 for processing. For example, driver 216 stops vehicle at location and does not place required traffic safety cones next to vehicle. Vehicle event recorder 202 outputs marked driving data for driving incident to vehicle data server 200 and instructor 210 reviews incident data using instructor system 212. Instructor 210 provides coaching data indicating that driver should place cones around vehicle. Driver 216 receives coaching data using driver system 214 and changes driver behavior such that cones are placed around vehicle. Vehicle sensors 204 send information about proper cone placement to vehicle event recorder 202. In some embodiments, video data is marked that the driver has successfully changed behavior in response to a prior coaching session. In some embodiments, vehicle data server 200 provides an indication to mark video regarding the topic or subject coached in a coaching session. In some embodiments, the marking of the video is annotated as regarding a prior coaching session.

Figure 3:
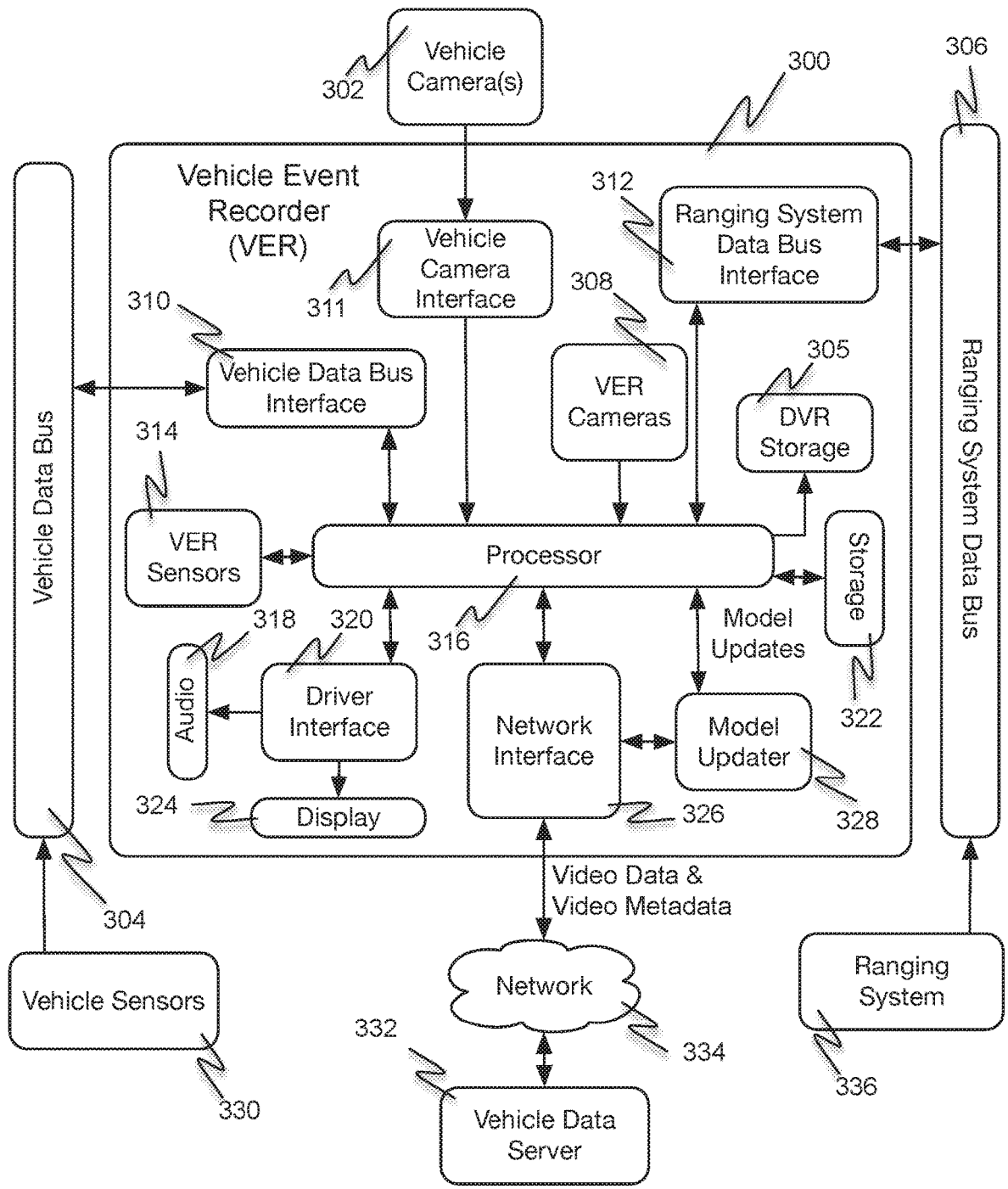
FIG. 3 is a block diagram illustrating an embodiment of a vehicle event recorder.

FIG. 3 is a block diagram illustrating an embodiment of a vehicle event recorder. In some embodiments, vehicle event recorder 300 of FIG. 3 is used to implement vehicle event recorder 102 of FIG. 1. In the example shown, vehicle event recorder 300 comprises processor 316, vehicle data bus interface 310, ranging system data bus interface 312, vehicle event recorder (VER) camera(s) 308, VER sensors 314, storage 322, driver interface 320, network interface 326, and model updater 328. Vehicle data bus interface 310 receives information from vehicle sensors 330 via vehicle data bus 304. Vehicle camera interface 311 receives video data from vehicle camera(s) 302 that it stores in DVR storage 305 and passes to processor 316. Ranging system data bus interface 312 receives information from ranging system 336 via ranging system data bus 306. Processor 316 sends video metadata of interest to vehicle data server 332 via network interface 326 and network 334. Model updater 328 sends model updates to processor 316 based on data and current models received from network interface 326. Driver interface 320 communicates to driver via audio 318 and display 324. For example, vehicle event recorder 300 senses that the vehicle stops at a particular location. Processor 316 receives data about the vehicle and its present environment through VER sensors 314, vehicle sensors 330, vehicle camera(s) 302, VER camera(s) 308, and ranging system 336 and then processes the data using models for operation, activity, and risk factors. For example, processor uses its operational model to determine that the vehicle is stopped for an unloading operation (vs. parked) and uses its activity model to determine that there are several people near the vehicle and uses its risk factor model to determine that there may be unauthorized people in the vehicle with incorrect packages being off loaded. Processor 316 marks the present epoch of recorded video as an epoch of interest and sends it to vehicle data server 332 via network 334 for review.

In some embodiments, vehicle data server 332 uses video metadata to determine video data that should be sent from vehicle event recorder 300 to vehicle data server 332.

In some embodiments, ranging system data bus 306 and vehicle data bus 304 are the same bus.

In some embodiments, vehicle event recorder 300 is able to control when ranging system 336 is operational. For example, processor 316 sends message via ranging system data bus interface 312 and ranging system data bus 306 to ranging system 336 indicating to turn on or turn off ranging system 336 or to take data and/or send data to processor 316. In various embodiments, processor 316 uses the messaging to turn the ranging system on when ignition is off, when the vehicle is moving slowly, when the vehicle is stationary, when the vehicle has indicated that the ranging system is off, or any other appropriate time to indicate to turn the ranging system on.

Figure 4:
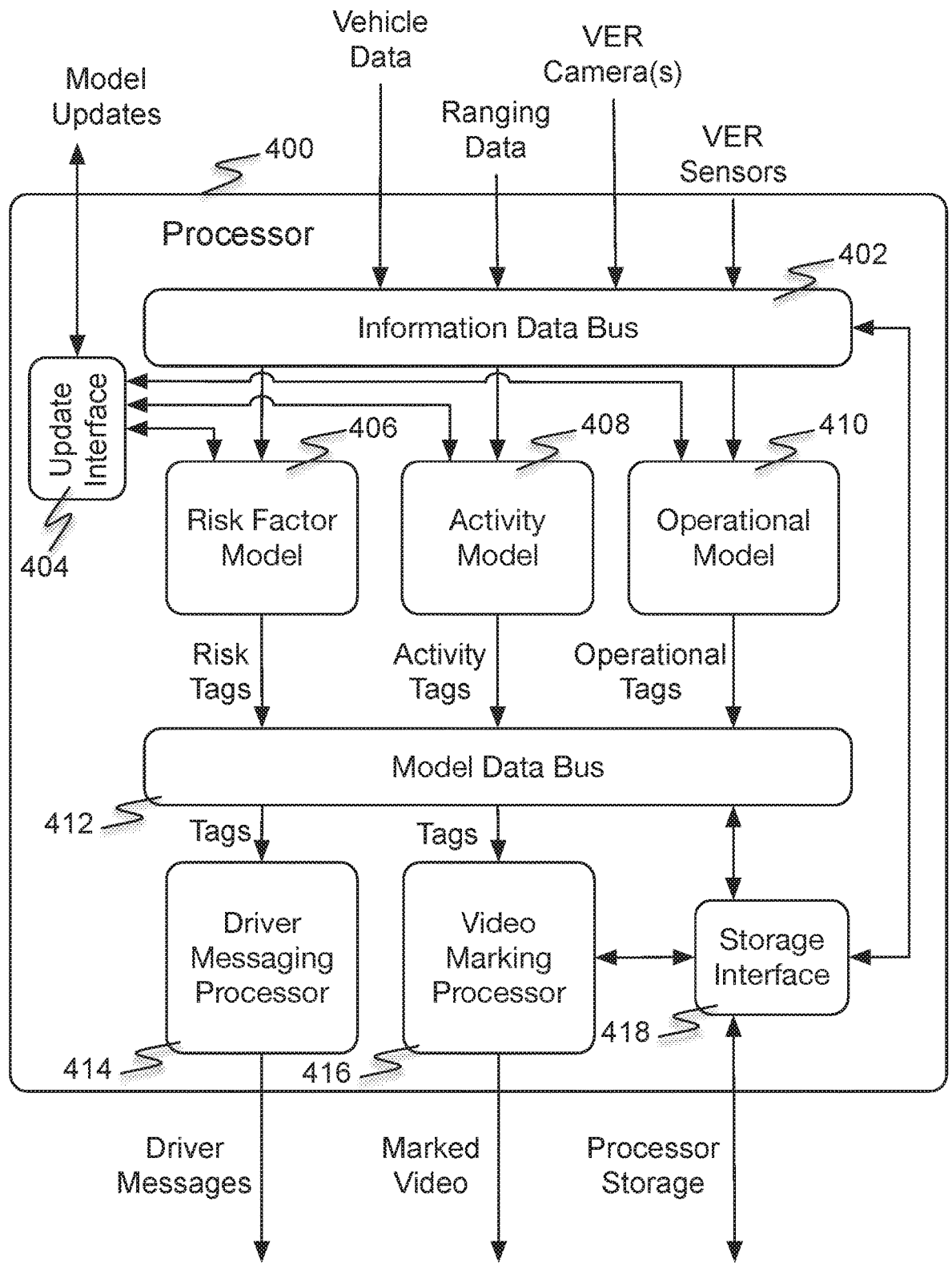
FIG. 4 is a block diagram illustrating an embodiment of a vehicle event recorder processor.

FIG. 4 is a block diagram illustrating an embodiment of a vehicle event recorder processor. In some embodiments, processor 400 of FIG. 4 is used to implement processor 316 of FIG. 3. In the example shown, processor 400 comprises information data bus 402, model data bus 412, risk factor model 406, activity model 408, operational model 410, model update interface 404, driver messaging processor 414, video metadata processor 416, and storage interface 418. Information data bus 402 receives vehicle data, ranging data, VER camera(s), and VER sensors. Risk factor model 406, activity model 408, operational model 410, process data on information data bus 402 and transmit risk-factor tags (e.g.

high theft risk), activity tags (e.g. pedestrian movements), and operational tags (e.g. unloading) respectively to model data bus 412. Video marking processor 416 receives tags from model data bus 412 and determines whether current video epoch should be marked as an area of interest for further review or storage. For example, operational tags indicating unloading at an unscheduled location may warrant review of vehicle video streams for potential unauthorized activities or theft. Driver messaging processor 414 receives tags from model data bus 412 and determines whether a message should be sent to the driver. For example, risk-factor model 406 receives ranging data from information data bus 402 and determines there is high risk of collision due to the vehicle following too close to a forward vehicle that is in front of the vehicle the vehicle event recorder is in. Driver messaging processor 414 receives this high-risk tag and notifies the driver to not follow as close to the forward vehicle. Model update interface 404 updates (e.g., as provided from the vehicle data server) all models for optimal processing based on machine learning or instructor input. For example, risk factor model 406 may be updated by an instructor based on a prior incident data such that similar incidents in the future can be automatically identified. Storage interface 418 stores data from information data bus 402 (e.g., vehicle sensors, vehicle camera(s), VER camera(s), VER sensors, etc.) and model data bus 412 as needed by the video metadata processor 416.

Figure 5:
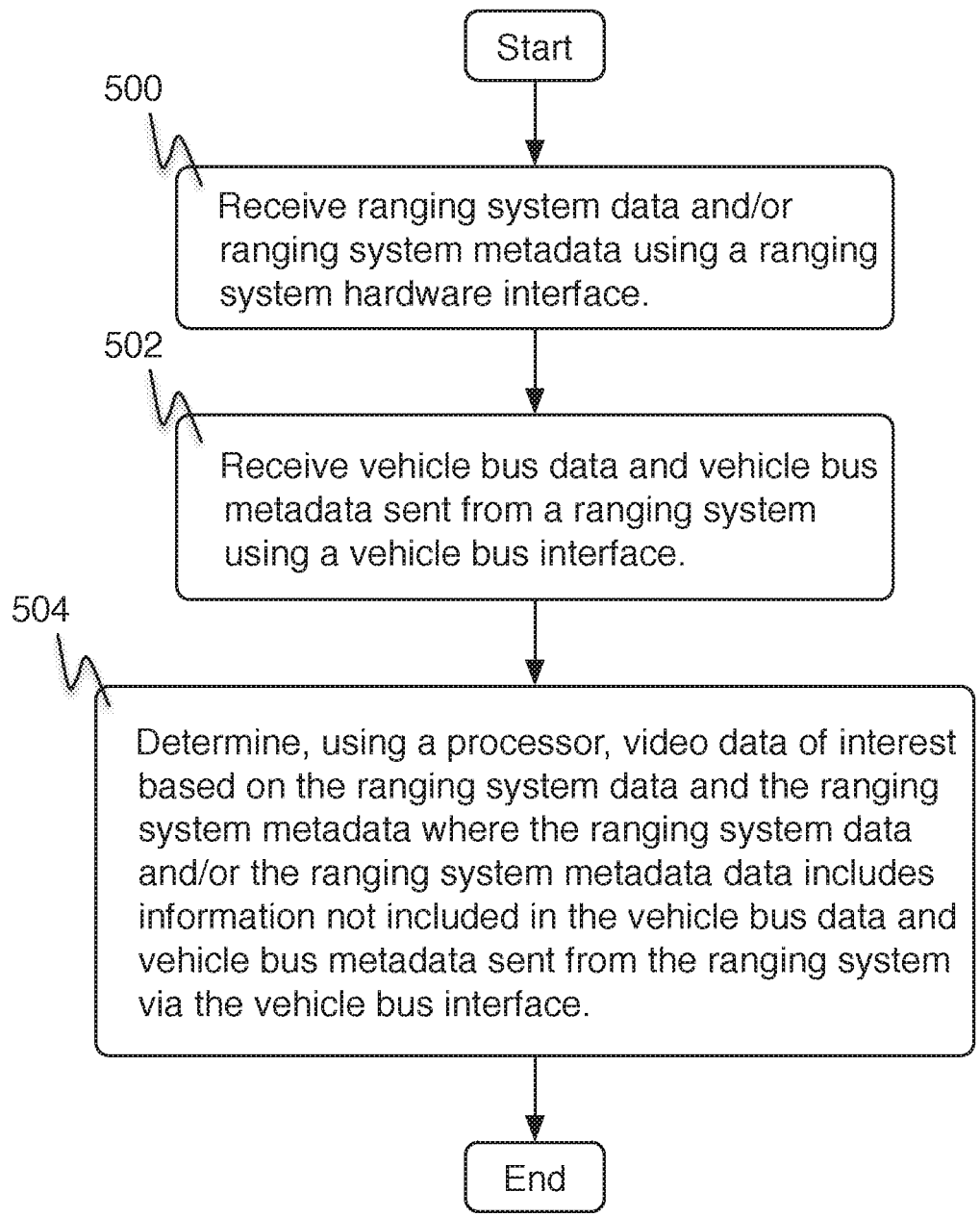
FIG. 5 is a flow diagram illustrating an embodiment of a system for video processing using ranging system data for identifying video data of interest.

FIG. 5 is a flow diagram illustrating an embodiment of a system for video processing using ranging system data for identifying video data of interest. In some embodiments, the process of FIG. 5 is executed by vehicle event recorder 102 of FIG. 1, vehicle event recorder 202 of FIG. 2, and/or vehicle event recorder 300 of FIG. 3. In the example shown in 500, ranging system data and/or ranging system metadata is received using a ranging system hardware interface. For example, the ranging system uses lidar to characterize an object (e.g. a person, a vehicle, a building, a bicycle, a scooter, a motorcycle, a truck, an adult, a child, a cone, a garbage can, a box, a pedestrian, a safety gear item, a hat, or a vest.) and an action (e.g. a distance, a direction, a speed, a lane, a position, a driver behavior, a work behavior, a compliance behavior, a theft behavior, a vehicle entry time, a vehicle exit time, a cargo entry time, a cargo exit time, a behavior stop time, a behavior start time, an engine on time, an engine off time, a traffic state, an activity near a loading gate, an activity near a rear lift, or a safety behavior), and provides these characterizations to the ranging system hardware interface. In some embodiments, the ranging system comprises a video system, a lidar system, or a radar system. In some embodiments, the ranging system also comprises a detection system that identifies an object using the ranging system data. In some embodiments, the ranging system hardware interface is further configured to provide the ranging system hardware interface with a request for the data and the metadata. In some embodiments, the ranging system data and/or ranging system metadata includes object characterization data regarding an object.

In 502, vehicle bus data and vehicle bus metadata is sent from a ranging system and received using a vehicle bus interface. For example, the ranging system provides a warning to the vehicle data bus along with data supporting the warning—for example, the metadata comprises a pedestrian warning accompanied by a distance data from the car of the pedestrian that are provided from the ranging system to the vehicle event recorder via the vehicle data bus.

In 504, video data of interest based on the ranging system data and the ranging system metadata is determined using a processor where the ranging system data and/or the ranging system metadata data includes information not included in the vehicle bus data and vehicle bus metadata sent from the ranging system via the vehicle bus interface. For example, vehicle event recorder processes the data from the ranging system data bus and vehicle data bus and sends marked video and driving data to network to vehicle data server. In some embodiments, the vehicle event recorder also uses data and metadata received via the vehicle data bus (e.g., vehicle state sensor data) or from vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. The marked video and driving data can then reviewed and curated by an instructor using an instructor system to create coaching data or analyzed by the processor to identify video segments of interest. The coaching data is distributed to a driver system for coaching sessions with a driver.

Figure 6:
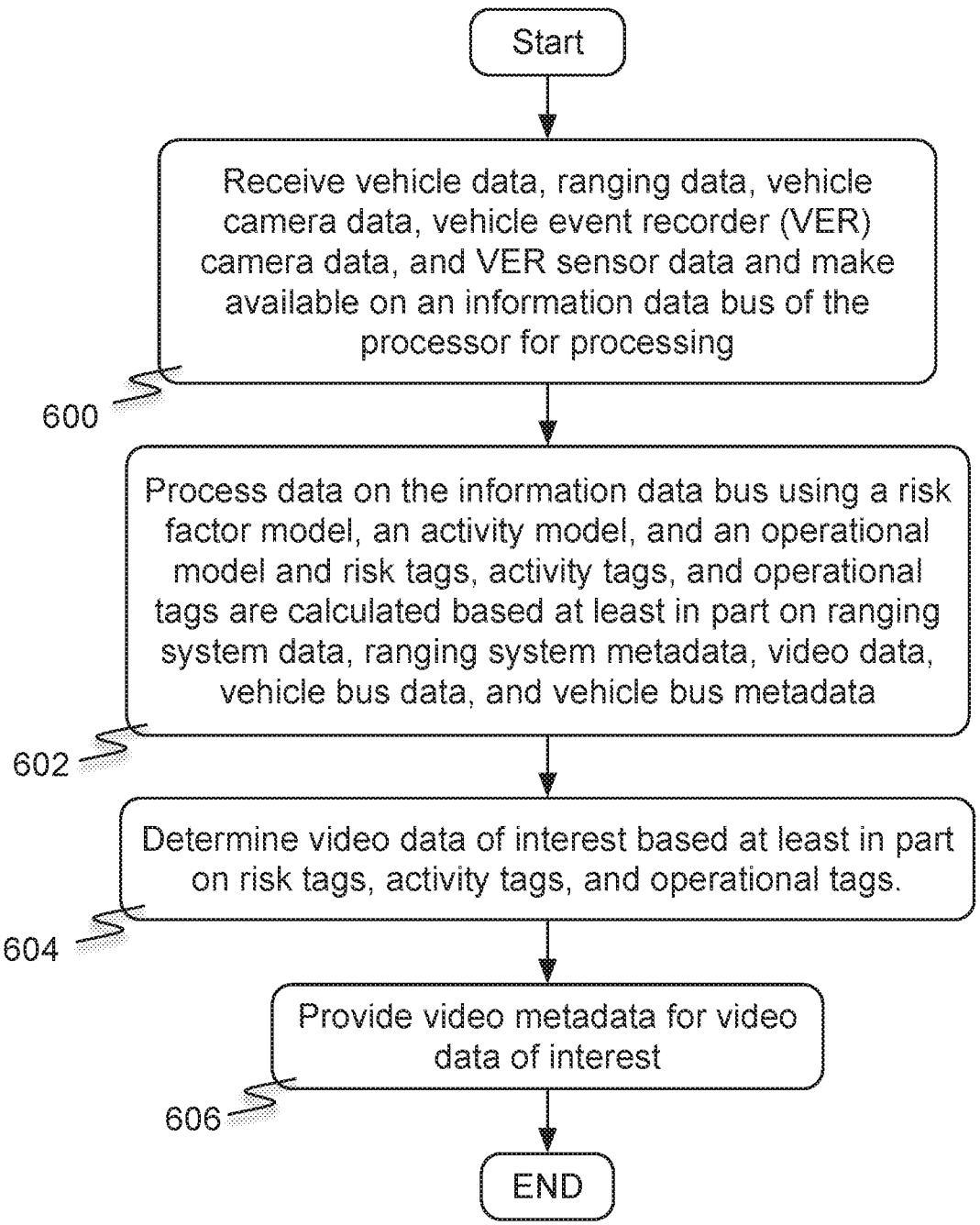
FIG. 6 is a flow diagram illustrating and embodiment of a system for determining video data of interest based at least in part on a risk factor model, an activity model, and an operational model.

FIG. 6 is a flow diagram illustrating and embodiment of a system for determining video data of interest based at least in part on a risk factor model, an activity model, and an operational model. In some embodiments, the process of FIG. 6 is executed by a processor of a VER (e.g., processor 400 of FIG. 4. In the example shown in 600, vehicle data, ranging data, vehicle camera data, vehicle event recorder (VER) camera data, and VER sensor data is received and made available on an information data bus of the processor for processing.

In some embodiments, the VER explicitly requests ranging data, vehicle camera data, and/or VER sensor data. In some embodiments, the VER explicitly turns on or indicates to turn on a device either internal to the VER or external to the VER (e.g., a ranging system or a video camera). In some embodiments, the VER explicitly turns off or indicates to turn off a device either internal to the VER or external to the VER (e.g., a ranging system or a video camera). In various embodiments, the VER indicates to turn on or off when the vehicle itself is not on, the ignition is off, the vehicle has not turned on the ranging system (e.g., when the vehicle is stationary), or in any other appropriate state.

In 602, data on the information data bus is processed using a risk factor model, an activity model, and an operational model and risk tags, activity tags, and operational tags are calculated based at least in part on ranging system data, ranging system metadata, video data, vehicle bus data, and vehicle bus metadata. For example, data on the information data bus is processed by the operational model to determine that the vehicle is stopped for an unloading operation (vs. parked), is processed by the activity model to determine that there are several people near the vehicle, and is processed by the risk factor model to determine that there may be unauthorized people in the vehicle with incorrect packages being off loaded.

In 604, video data of interest is determined based at least in part on risk tags, activity tags, and operational tags. For example, VER provides video metadata as an epoch of interest because data from the operational and activity models indicate that the vehicle is being unloaded at an unscheduled location with multiple people.

In 606, video metadata for video data of interest is provided. For example, VER sends metadata (e.g., metadata tags) to vehicle data server via the network for review by the instructor system who will decide which video to bring back for review. Alternatively, an algorithm can be executed on the video metadata to determine which video segments to upload.

Figure 7A:
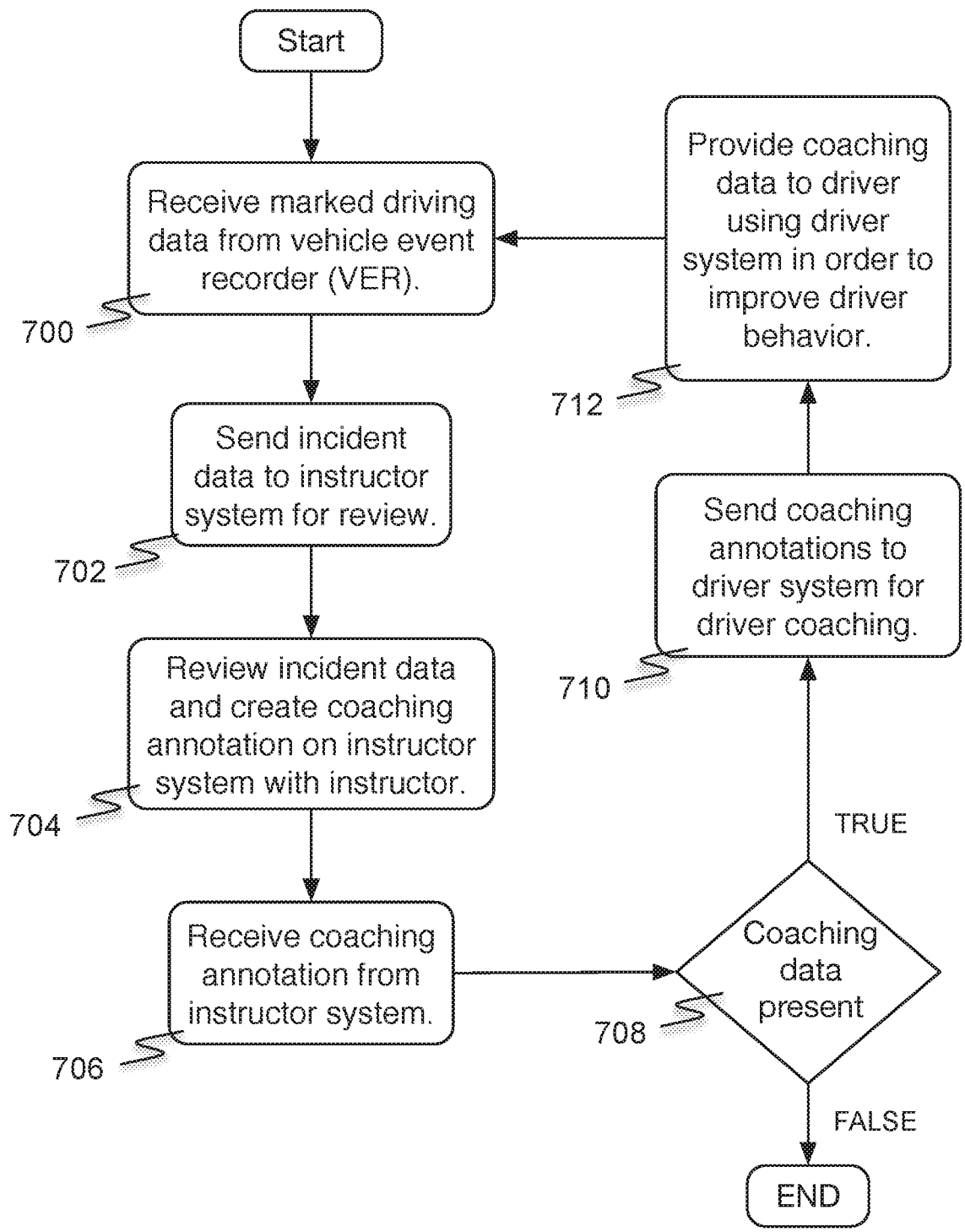
FIG. 7A is a flow diagram illustrating an embodiment of a process to improve driver behavior.

FIG. 7A is a flow diagram illustrating an embodiment of a process to improve driver behavior. In some embodiments, 700, 702, 706, 708, and 710 of the process of FIG. 7A are executed on a vehicle data server (e.g., vehicle data server 112 of FIG. 1). In some embodiments, 704 of the process in FIG. 7A is executed on an instructor system (e.g., instructor system 114 of FIG. 1). In some embodiments, 712 of the process of FIG. 7A is executed on a driver system (e.g., driver system 118 of FIG. 1). In the example shown in 700, marked driving data from vehicle event recorder (VER) is received. For example, video from around the vehicle is marked for review because a safety compliance rule is not followed (e.g., traffic cones were not visible while vehicle was being unloaded). In various embodiments, the marked video is due to a number of other situations of interest (e.g., likely accident incidents, likely workman's compensation incidents, likely traffic incidents, inefficient incidents, gas mileage incidents, non-work-related incidents, etc.). In 702, incident data is sent to instructor system for review.

In 704, incident data is reviewed by an instructor and coaching annotations are created by instructor on instructor system. For example, an instructor reviews the video of an unloading operation and annotates the video with coaching data indicating that the driver should comply with the safety compliance rule (e.g., placing traffic cones around vehicle when unloading).

In 706, coaching annotations (if any) are received from the instructor system. In 708, it is determined if coaching data is present. For example, if coaching data is not present, the feedback loop to improve driver behavior is ended. If coaching data is present, in 710 coaching annotations are sent to driver system for driver coaching.

In 712, coaching data is provided to driver using driver system in order to improve driver behavior. For example, driver is instructed by driver system to comply with the safety compliance rule (e.g., place traffic cones around vehicle while unloading). As a result, driver behavior is changed such that in the future the driver is in compliance with safety compliance rules (e.g., unloading operations now include traffic cones being placed prior to unloading by the driver).

Figure 7B:
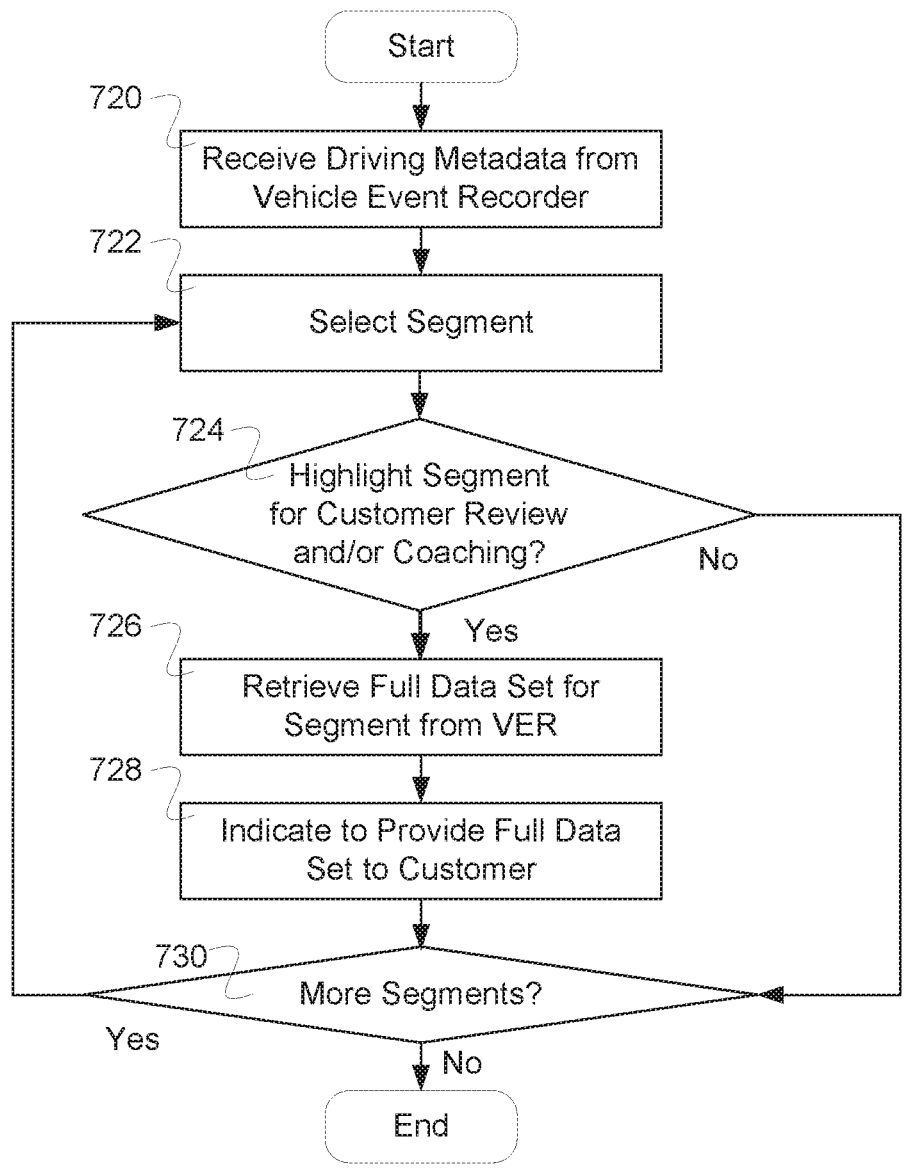
FIG. 7B is a flow diagram illustrating an embodiment of a process to highlight data for customer review.

FIG. 7B is a flow diagram illustrating an embodiment of a process to highlight data for customer review. In some embodiments, the process of FIG. 7B is executed on a vehicle data server (e.g., vehicle data server 112 of FIG. 1). In the example shown, in 720 driving metadata is received from a vehicle event recorder. For example, a video event recorder has generated metadata indicating that a segment of video is marked as being of interest (e.g., using a model) and/or as having content that may be interesting for further analysis or review. In 722, a segment is selected. For example, a segment of video data as selected using the received driving metadata that includes information regarding video segments. In 724, it is determined whether to highlight the segment for customer review and/or coaching. For example, an algorithm running on a vehicle data server is used to determine from the video metadata whether a video data segment might be interesting for a customer to review for and/or use for coaching. In response to it not being determined to highlight the segment for customer review and/or coaching, control passes to 730. In response to it being determined to highlight the segment for customer review and/or coaching, in 726 the full data set is retrieved for segment from one or more VERs. In 728, it is indicated to provide full data set to customer. In 730, it is determined whether there are more segments. In response to determining that there are no more segments, the process ends. In response to determining that there are more segments, control passes to 722.

Figure 7C:
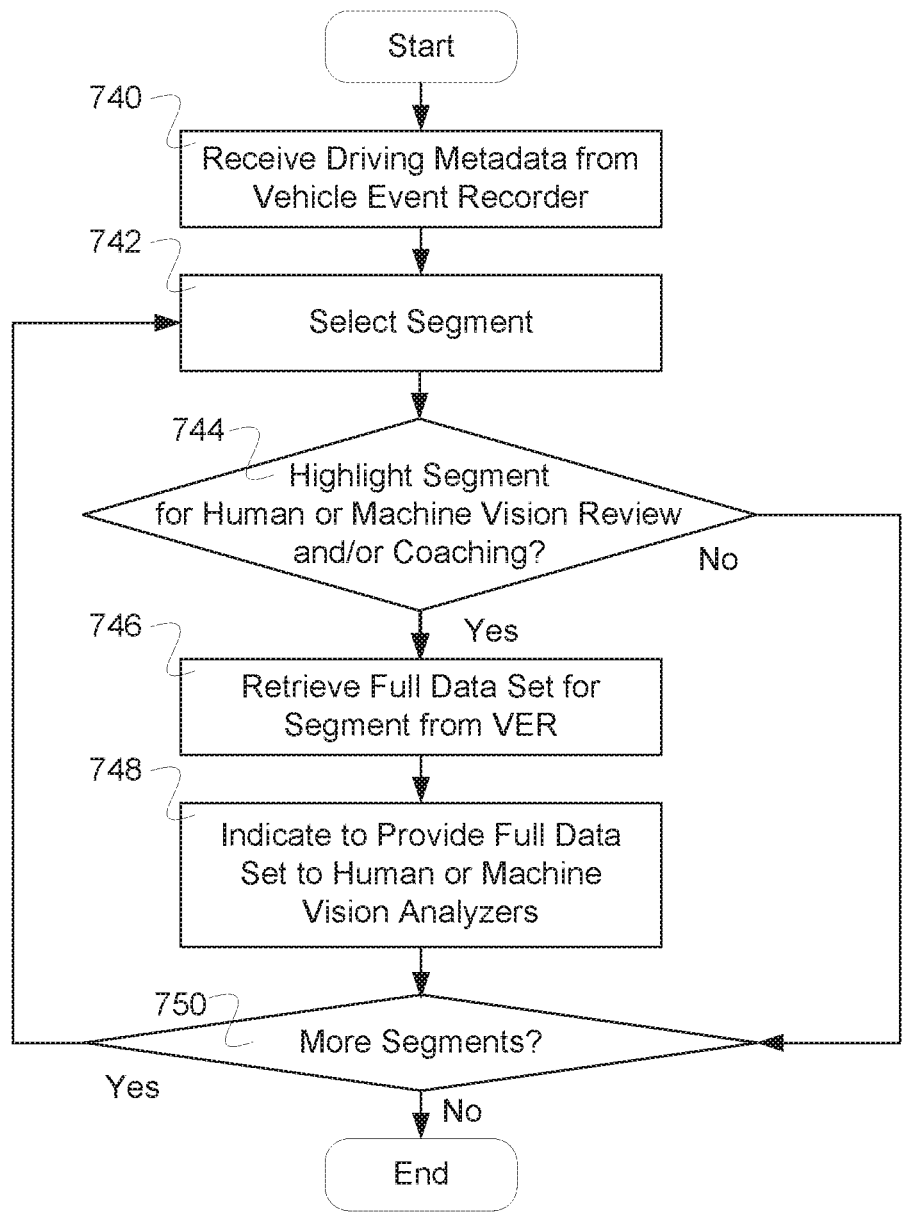
FIG. 7C is a flow diagram illustrating an embodiment of a process to highlight data for customer review.

FIG. 7C is a flow diagram illustrating an embodiment of a process to highlight data for customer review. In some embodiments, the process of FIG. 7C is executed on a vehicle data server (e.g., vehicle data server 112 of FIG. 1). In the example shown, in 740 driving metadata is received from a vehicle event recorder. For example, a video event recorder has generated metadata indicating that a segment of video is marked as being of interest (e.g., using a model) and/or as having content that may be interesting for further analysis or review. In 742, a segment is selected. For example, a segment of video data as selected using the received driving metadata that includes information regarding video segments. In 744, it is determined whether to highlight the segment for human or machine vision review and/or coaching. For example, an algorithm running on a vehicle data server is used to determine from the video metadata whether a video data segment might be interesting for a human or machine vision model to review for and/or use for coaching. In response to it not being determined to highlight the segment for human or machine vision review and/or coaching, control passes to 750. In response to it being determined to highlight the segment for human or machine vision review and/or coaching, in 746 the full data set is retrieved for segment from one or more VERs. In 748, it is indicated to provide full data set to human or machine vision analyzers. In 750, it is determined whether there are more segments. In response to determining that there are no more segments, the process ends. In response to determining that there are more segments, control passes to 742.

Figure 8:
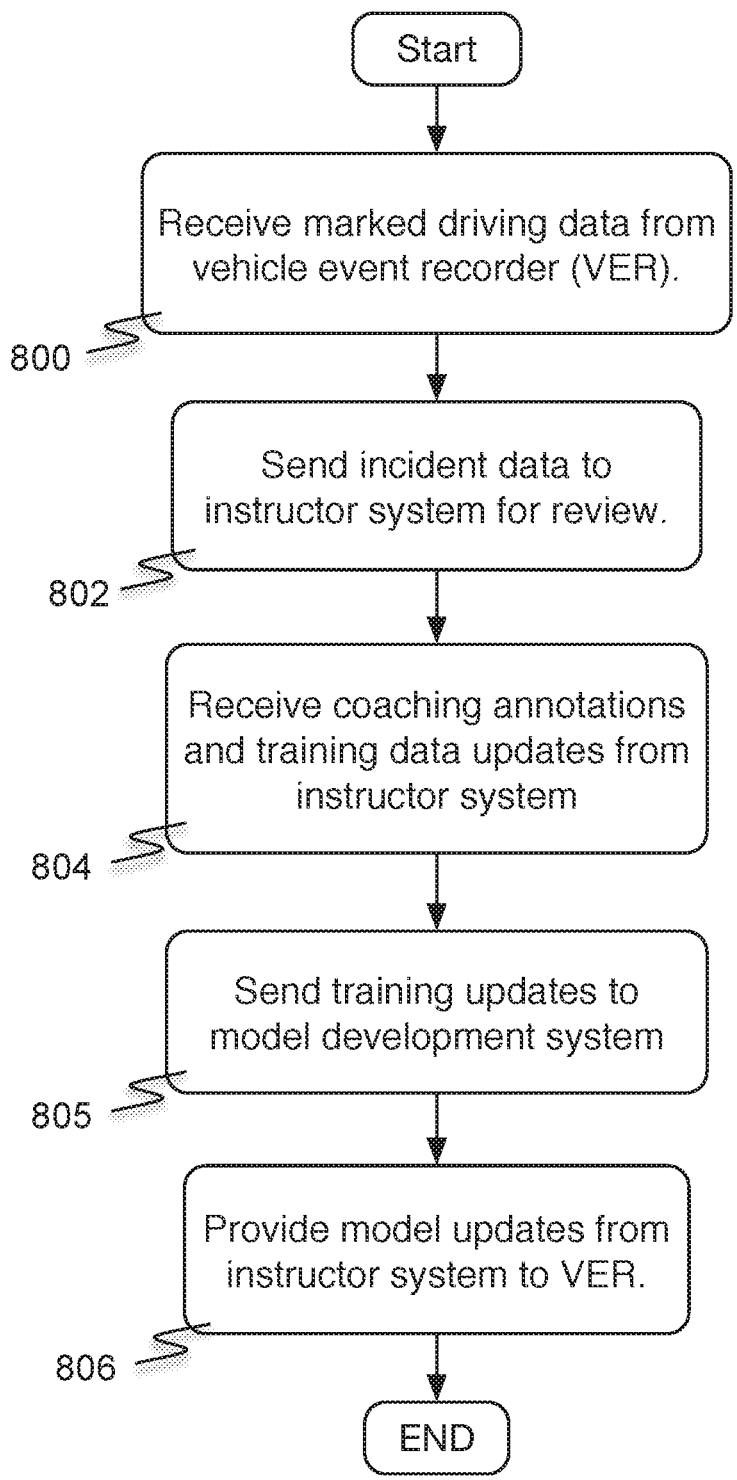
FIG. 8 is a flow diagram illustrating an embodiment of a system for updating risk-factor, activity, and operational models using an instructor system.

FIG. 8 is a flow diagram illustrating an embodiment of a system for updating risk-factor, activity, and operational models using an instructor system. In some embodiments, the process of FIG. 8 is executed on a vehicle data server (e.g., vehicle data server 112 of FIG. 1). In the example shown in 800, marked driving data is received from vehicle event recorder (VER). In some embodiments, vehicle event recorder is implemented by vehicle event recorder 202 of FIG. 2.

In 802, Incident data is sent to instructor system for review. In some embodiments, instructor system is implemented by instructor system 212 of FIG. 2. For example, video streams from around the vehicle are sent to the instructor system that have been marked by the vehicle event recorder as areas of interest because of high activity, high risk, or matching a particular operational condition (e.g. marked video showing that traffic cones were not placed around vehicle while an unloading operation was taking place is sent to instructor system).

In 804, coaching annotations and training data updates are received from instructor system. For example, instructor annotates video segments with indications regarding what subject could be coached using the video, whether the video is indicating positive or negative coaching material, whether the material is common or unusual, or any other appropriate coaching notations (e.g., annotations might include notes:

video coaching subject safety compliance, negative example—what not to do, violation is common for drivers and for this driver, coaching should suggest that cones need to be placed around vehicle prior to an unloading operation).

In 805, training data updates are sent to a model development system. For example, instructor using instructor system determines that a particular video epoch was not automatically marked as high risk and updates the risk-factor model such that similar events in the future are marked as high risk. Similarly, instructor may update the activity model to indicate that particular levels of activity are to be marked or may update the operational model to indicate that particular operations should be marked (e.g. instructor system updates risk-factor model to indicate that lack of traffic cones during unloading operations are of high risk).

In 806, model updates are provided by the model development system to the VER. For example, a machine vision artificial intelligence development system provides model updates to the VER. In various embodiments, the model updates comprise updates to the risk-factor model, the activity model, and the operational model. In some embodiments, the risk-factor model comprises risk-factor model 406 of FIG. 4, the activity model comprises activity model 408 of FIG. 4, and/or the operational model comprises operational model 410 of FIG. 4.

Figure 9:
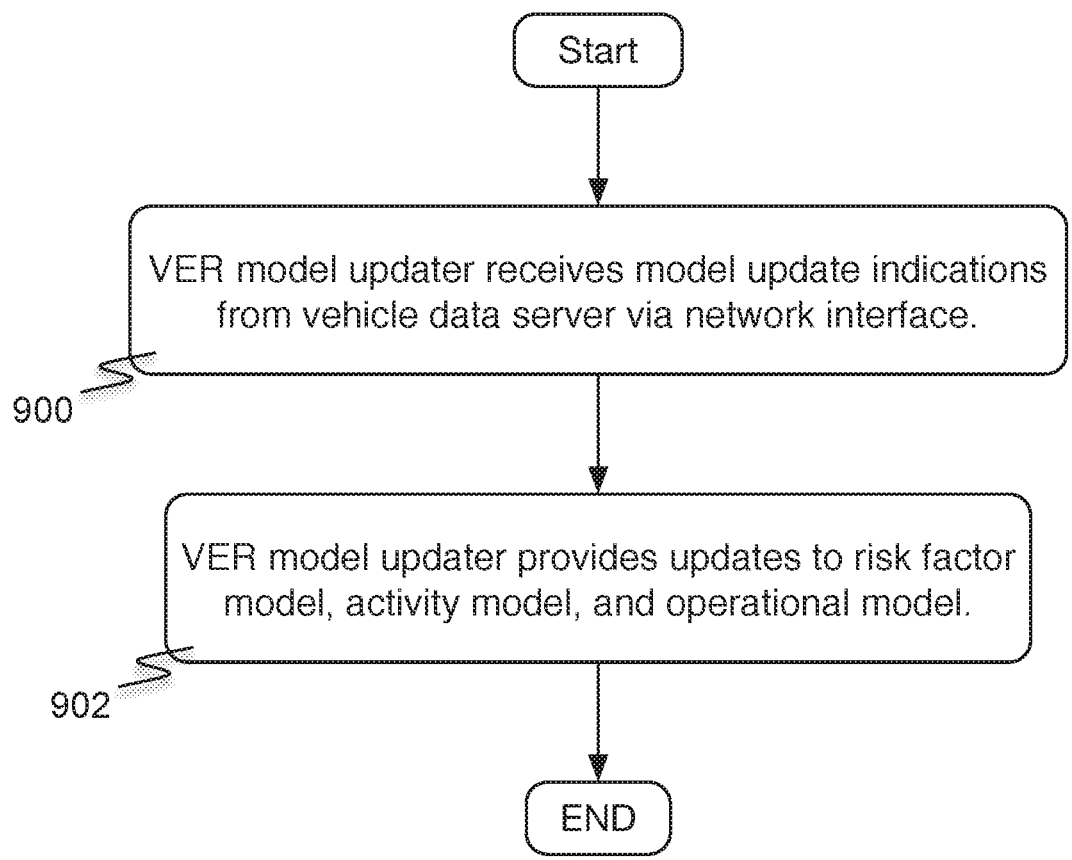
FIG. 9 is a flow diagram illustrating an embodiment of a vehicle event recorder (VER) model update system for updating risk factor, activity, and operational models.

FIG. 9 is a flow diagram illustrating an embodiment of a vehicle event recorder (VER) model update system for updating risk factor, activity, and operational models. In the example shown in 900, VER model updater receives model update indications from vehicle data server via network interface. In some embodiments, VER model updater is implemented by model updater 328 of FIG. 3 and vehicle data server is implemented by vehicle data server 332 of FIG. 3. In some embodiments, VER model updater receives model updates from a model development system directly instead of via a vehicle data server.

In 902, VER model updater provides updates to risk factor model, activity model, and operational model. In some embodiments, risk factor model is implemented by risk factor model 406 of FIG. 4, activity model is implemented by activity model 408 of FIG. 4, and operational model is implemented by operational model 410 of FIG. 4. In some embodiments, a human instructor may provide updates to the models via the model updater. For example, an existing risk-factor model may not indicate that an additional passenger on the vehicle indicates high risk of unauthorized use of the vehicle. However, after an instructor review of vehicle video, it is determined that an additional passenger was being transported for an unauthorized fee to the driver. The instructor system sends a model update to the risk factor model such that future occurrences are automatically tagged as high risk. In some embodiments, a machine learning algorithm may provide updates to the models.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for video processing, comprising:
   a ranging system hardware interface configured to:
      receive ranging system data, ranging system metadata, or the ranging system data and the ranging system metadata; and
      receive video data from a vehicle camera;
   a vehicle bus interface configured to:
      receive vehicle bus data and vehicle bus metadata sent from a ranging system; and
   a processor configured to:
      determine video data of interest based at least in part on the ranging system data and the ranging system metadata, wherein the ranging system data, the ranging system metadata, or the ranging system data and the ranging system metadata includes information not included in the vehicle bus data and vehicle bus metadata sent from the ranging system via the vehicle bus interface, and wherein the determining of the video data of interest comprises to:
         receive one or more types of vehicle data: vehicle data, ranging data, vehicle camera data, vehicle event recorder (VER) data, and/or VER sensor data and make available the one or more types of vehicle data on an information data bus for processing;
         process the one or more types of vehicle data using a risk factor model, an activity model, and an operational model to calculate a risk tag, an activity tag, and an operational tag based on the ranging system data, the ranging system metadata, the video data from the vehicle camera, vehicle bus data, and vehicle bus metadata;
         determine the video data of interest based on the risk tag, the activity tag, and the operational tag; and
         provide video metadata for the video data of interest.

2. The system as in claim 1, wherein the processor indicates to become operational in order to provide the ranging system data, the ranging system metadata, or the ranging system data and the ranging system metadata.

3. The system as in claim 1, wherein the processor indicates to power on in order to provide the ranging system data, the ranging system metadata, or the ranging system data and the ranging system metadata.

4. The system as in claim 1, wherein the ranging system comprises a video system, lidar system, or a radar system.

5. The system as in claim 1, wherein the ranging system also comprises a detection system that identifies an object using the ranging system data.

6. The system of claim 1, wherein the ranging system hardware interface is further configured to provide the ranging system hardware interface a power up indication.

7. The system of claim 1, wherein the ranging system hardware interface is further configured to provide the ranging system hardware interface with a request for the data and the metadata.

8. The system as in claim 1, wherein the ranging system data, the ranging system metadata, or the ranging system data and the ranging system metadata includes object characterization data regarding an object.

9. The system as in claim 8, wherein the object comprises at least one of: a person, a vehicle, a building, a bicycle, a scooter, a motorcycle, a truck, an adult, a child, a cone, a garbage can, a box, a pedestrian, a safety gear item, a hat, or a vest.

10. The system as in claim 8, wherein the object characterization data comprises at least one of: a distance, a direction, a speed, a lane, a position, a driver behavior, a work behavior, a compliance behavior, a theft behavior, a vehicle entry time, a vehicle exit time, a cargo entry time, a cargo exit time, a behavior stop time, a behavior start time, an engine on time, an engine off time, a traffic state, an activity near a loading gate, an activity near a rear lift, or a safety behavior.

11. The system of claim 1, wherein the video data of interest is used to generate video metadata that is transmitted to a server, wherein the server evaluates the video metadata to determine whether the video data of interest is to be transferred to the server.

12. The system of claim 1, wherein the video data of interest is marked for storage.

13. The system of claim 1, wherein the video data of interest is marked for possible transfer to a server.

14. The system of claim 1, wherein the video data of interest is marked for coaching.

15. The system of claim 1, wherein the video data of interest is analyzed for an operational condition.

16. The system of claim 15, wherein the operational condition comprises one of: proper placement of cones, proper safety gear employed, proper wearing of a hat, or proper wearing of a vest.

17. The system of claim 1, wherein the video data of interest is analyzed for a risk factor.

18. The system of claim 17, wherein the risk factor comprises one of: one or more pedestrians near a vehicle or high traffic near the vehicle.

19. The system of claim 1, wherein the video data of interest is analyzed for an activity taking place.

20. The system of claim 19, wherein the activity taking place comprises one of: an activity around a loading gate, an activity around a passenger door, or an activity around a rear lift.

21. The system of claim 1, wherein a sensor detection threshold is indicated to be changed based at least in part on an analysis of the video data of interest.

22. The system of claim 1, wherein a risk factor model is updated based on a feedback rating of a determined risk factor.

23. The system of claim 1, wherein an activity model is updated based on a feedback rating of an activity taking place.

24. The system of claim 1, wherein an operational model is updated based on a feedback rating of an operation taking place.

25. A method for video processing, comprising:
receiving ranging system data, ranging system metadata, or the ranging system data and the ranging system metadata using a ranging system hardware interface;
receiving video data from a vehicle camera using the ranging system hardware interface;
receiving vehicle bus data and vehicle bus metadata sent from a ranging system using a vehicle bus interface;
determining, using a processor, video data of interest based at least in part on the ranging system data and the ranging system metadata, wherein the ranging system data, the ranging system metadata, or the ranging system data and the ranging system metadata includes information not included in the vehicle bus data and vehicle bus metadata sent from the ranging system via the vehicle bus interface, and wherein the determining of the video data of interest comprises:
receiving one or more types of vehicle data: vehicle data, ranging data, vehicle camera data, vehicle event recorder (VER) data, and/or VER sensor data and make available the one or more types of vehicle data on an information data bus for processing;
processing the one or more types of vehicle data using a risk factor model, an activity model, and an operational model to calculate a risk tag, an activity tag, and an operational tag based on the ranging system data, the ranging system metadata, the video data from the vehicle camera, vehicle bus data, and vehicle bus metadata;
determining the video data of interest based on the risk tag, the activity tag, and the operational tag; and
providing video metadata for the video data of interest.

26. A computer program product for video processing, the computer program product being embodied in a non-transitory computer readable storage medium and comprising computer instructions for:
receiving ranging system data, ranging system metadata, or the ranging system data and the ranging system metadata using a ranging system hardware interface;
receiving video data from a vehicle camera using the ranging system hardware interface;
receiving vehicle bus data and vehicle bus metadata sent from a ranging system using a vehicle bus interface;
determining, using a processor, video data of interest based at least in part on the ranging system data and the ranging system metadata, wherein the ranging system data, the ranging system metadata, or the ranging system data and the ranging system metadata includes information not included in the vehicle bus data and vehicle bus metadata sent from the ranging system via the vehicle bus interface, and wherein the determining of the video data of interest comprises:
receiving one or more types of vehicle data: vehicle data, ranging data, vehicle camera data, vehicle event recorder (VER) data, and/or VER sensor data and make available the one or more types of vehicle data on an information data bus for processing;
processing the one or more types of vehicle data using a risk factor model, an activity model, and an operational model to calculate a risk tag, an activity tag, and an operational tag based on the ranging system data, the ranging system metadata, the video data from the vehicle camera, vehicle bus data, and vehicle bus metadata;
determining the video data of interest based on the risk tag, the activity tag, and the operational tag; and
providing video metadata for the video data of interest.

* * * * *